July 10, 1951            S. ALLEN            2,560,401
LIQUID FUEL COMBUSTION CHAMBER FOR TURBINE UNITS
Filed Feb. 10, 1947            3 Sheets—Sheet 1
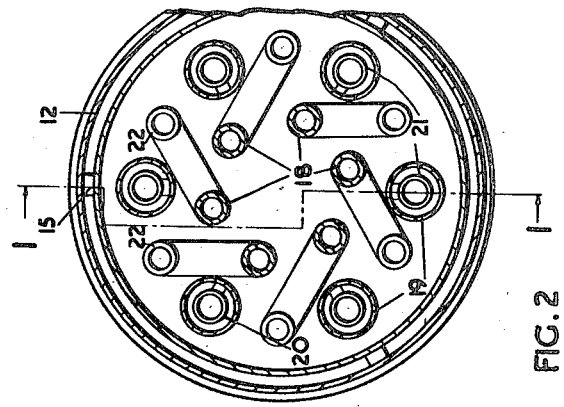
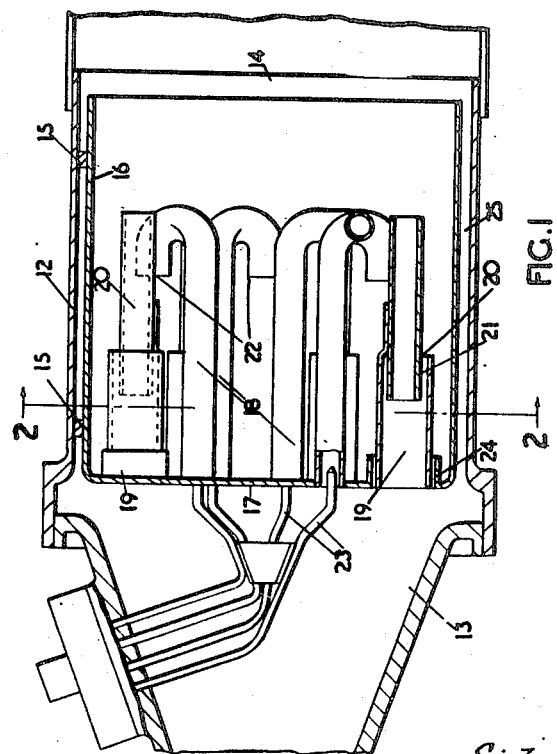
Inventor
Sidney Allen
by Mawhinney & Mawhinney
Attorneys July 10, 1951  S. ALLEN  2,560,401
LIQUID FUEL COMBUSTION CHAMBER FOR TURBINE UNITS
Filed Feb. 10, 1947  3 Sheets-Sheet 2

Inventor
Sidney Allen
by Mawhinney & Mawhinney
Attorneys

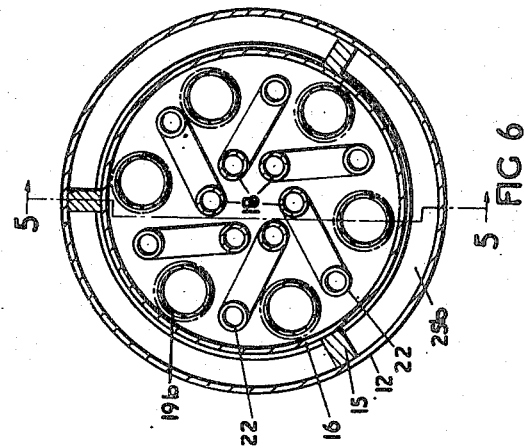
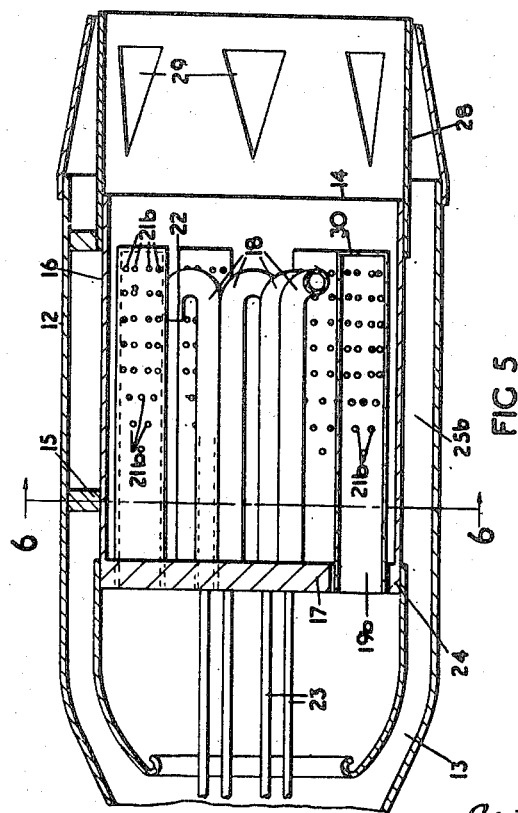

Patented July 10, 1951

2,560,401

UNITED STATES PATENT OFFICE 2,560,401

LIQUID FUEL COMBUSTION CHAMBER FOR TURBINE UNITS

Sidney Allen, Coventry, England, assignor to Armstrong Siddeley Motors Limited, Coventry, England Application February 10, 1947, Serial No. 727,509
In Great Britain February 23, 1946

7 Claims. (Cl. 60—44)

This invention relates to a liquid fuel combustion chamber for an internal-combustion turbine unit.

U. S. Patent No. 2,438,858, filed July 20, 1943, in the names of William Henry Lindsey and Sidney Allen, and issued March 30, 1948, to Armstrong Siddeley Motors Limited, discloses such a combustion chamber with which extremely satisfactory operation can be obtained.

The main object of the present invention is to provide a combustion chamber which is at least as satisfactory as that of the aforesaid patent and which will be more compact—i. e., with which combustion can be completed, or substantially completed, in an axially-shorter combustion chamber.

A further object is to obtain rapid mixing of the products of combustion with diluent air (for cooling said products) with low loss of total pressures.

Furthermore, whereas the combustion chamber of the aforesaid patent is essentially a unit in itself, the combustion chamber of the present invention may be associated with similar combustion chambers in such a way as to form one continuous annular chamber if desired.

According to the invention, a liquid fuel combustion chamber, within and along which compressed air is supplied (i. e., from the compressor of the turbine unit), has, spaced from one another, a plurality of pipes with inlet ends, into which the fuel is introduced, directed towards the oncoming air, the other ends of the pipes being curled round through angles of more than 90° and serving as outlets, offset laterally from the inlets, for the mixtures of fuel and air, and baffle means is interposed in the direct path of the oncoming air to the said outlets; but there are passages between the pipes by which oncoming air can travel to mix with, and substantially to complete combustion of, the said mixtures in the spaces surrounding the pipes.

In the accompanying drawings:

Figure 1 is a fragmentary sectional elevation of one form of combustion chamber according to the invention, the section being taken mainly on the line 1—1 of Figure 2;

Figure 2 is a cross-section taken on the line 2—2 of Figure 1;

Figure 4:
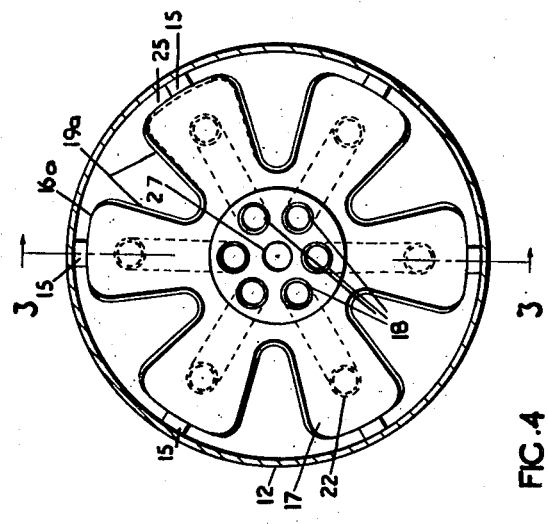
Figure 3:
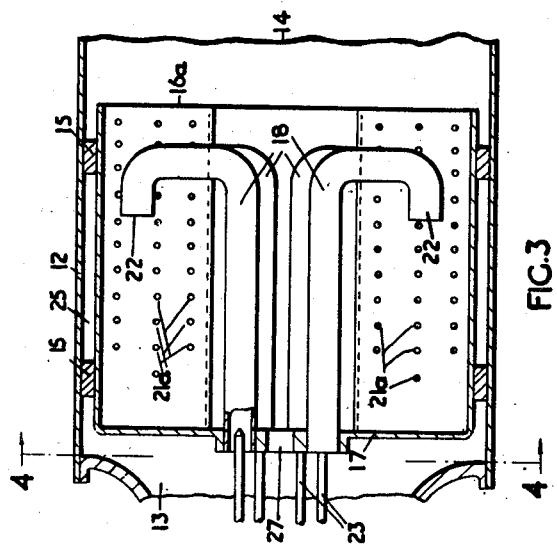

Figure 3 is a fragmentary sectional elevation of another form of combustion chamber according to the invention, the section being taken on the line 3—3 of Figure 4, which is a cross-section taken mainly on the line 4—4 of Figure 3; and Figures 5 and 6 are views similar, respectively, to Figures 1 and 2 of yet another form of combustion chamber according to the invention.

The same reference characters are applied as far as possible throughout the various figures to denote corresponding parts.

It may here be mentioned that the compressor output is used as combustion air and diluent air, the former being that necessary to effect and complete combustion and the diluent air being mixed with the products of combustion to reduce the temperature thereof to a value which is suitable for the associated turbine.

The combustion air essentially consists of primary air into which the fuel is injected to initiate combustion and to which is then supplied secondary air to complete combustion. It is not in ordinary conditions practicable to supply all the combustion air in the form of primary air.

In the constructions of Figures 1 and 3 there is no very clear line of demarcation between the supplies of secondary and diluent air, but in the construction of Figures 5 and 6 the diluent air is supplied independently of the secondary air.

Referring now to Figures 1 and 2 these show a main casing 12 along which the compressed air travels from the inlet end 13 to the delivery end 14. Spaced interiorly therefrom, as by blocks 15, is an inner casing 16 forming the combustion chamber proper. At its end adjacent the incoming air is disposed a baffle 17 having in it an inner circle of openings which receive the adjacent ends of J-shaped pipes 18, 18. It also has in it an outer circle of openings which receive with clearance the adjacent ends of relatively short pipes 19, 19 of larger cross-section. Secured to the outlet ends of the pipes 19 are other pipes 20 having annular clearance 21 from the interiors of the pipes 19. The outlet ends 22 of the J-shaped pipes which are directed towards the inlet end 13 of the main casing are screened from the incoming air by the baffle 17, being located between the adjacent pairs of pipes 20 as shown.

Fuel for combustion purposes is led to the inlet end of each of the J-shaped pipes by means of fuel pipes 23 supplied with fuel in any convenient manner. It may here be mentioned, however, that high fuel pressures are not necessary, with the combustion chamber of the invention, to atomize the fuel, as is the case with a spray-type or atomiser form of burner, and the use of relatively low fuel pressures imposes less severe conditions on the fuel pump and on the fuel system generally.

The open inlet ends of the J-shaped pipes 18 receive the primary air (which is mixed with fuel injected, by the pipes 23, into the inlet ends of the pipes 18), and the burning mixture of primary air and fuel issuing from the outlet ends 22 travels forwardly towards the baffle and thus heats the external surfaces of the pipes 18, serving thereby thoroughly to vapourise the fuel therein immediately the combustion chamber is put into operation. The secondary air for completing combustion issues into this flaming mixture through the annular openings 21 between each of the pipes 19 and its associated pipe 20, whilst additional secondary air enters through the annular clearances 24 round the inlet ends of the pipes 19 (supported from the baffle 17 by one or more lugs not shown) and serves for cooling the pipes 19.

Some of the diluent air travels along the pipes 20 to mix with the products of combustion, and combustion can be regarded as substantially fully completed by the time that the products of combustion reach the outlet of the combustion chamber casing 16. Here, however, further diluent air which has travelled along the annular passage 25 and has served to cool the casing 16 and to heat-insulate the casing 12 mingles with the partially diluted products of combustion and reduces these to a temperature which is suitable to the limitations of the turbine material.

The construction of Figures 3 and 4 differs from that of Figures 1 and 2 mainly in the arrangement of the means for supplying the secondary air and the main portion of the diluent air. Thus, the casing 16a (Figures 3 and 4), instead of being cylindrical as in Figures 1 and 2, has pressed-in portions round its periphery forming longitudinally-extending walls 19a the pairs of which serve for carrying between them the main portion of the diluent air, the longitudinal recesses thus formed communicating directly with the annular space 25 along which the remainder of the diluent air travels. Secondary air is introduced into the vicinity of the J-shaped tubes 18 through openings 21a provided in the walls 19a.

It will be observed from Figure 4 that the outlet ends of the passages bounded by the walls 19a are of less cross-section than the inlet ends, the walls of each converging along their length towards one another, and in this way the necessary pressure difference is introduced to ensure an adequate supply of secondary air.

The J-shaped tubes in this example are, it will be observed, arranged with their bends extending radially and with their outlet ends 22 disposed between adjacent pairs of the longitudinal passages bounded by the pairs of walls 19a. In addition, the baffle 17 in this case has a further opening 27 at its centre along which additional secondary air is supplied.

In the construction of Figures 5 and 6, the whole of the diluent air is taken along the annular passage 25b between the external and internal casings 12 and 16, and the latter has an extension 28 at its outlet end formed with a plurality of openings 29 through which the diluent air passes to mix with the products of combustion emerging from the outlet end 14 of the combustion chamber proper.

The secondary air is introduced along tubes 19b which are spaced between the adjacent pairs of the outlet ends 22 of the J-shaped tubes. The ends 30 of the tubes 19b remote from the inlet end are closed, and the secondary air passes through openings 21b provided in the pipes 19b for the purpose. The openings 21b (which are shown diagrammatically in Figure 5 as regards their disposition) are arranged so that air is added in increasing quantities along the lengths of the pipes 19b. A suitable disposition of the openings is such that the sum of the areas of the openings from the inlet end of the pipe to any point in its length is proportional to the fourth power of that length. The pipes 19b are prevented from becoming over-heated by the admission of air through the annular passages 24 round their inlet ends.

In all the constructions shown the J-shaped pipes are bent through 180°; but it will be understood that they need not be curved to this extent —for example, the curved ends may, so to speak, be pressed back somewhat so that the overall shape of the pipe is rather like a query or sickle.

The burning mixture issuing from the outlet ends 22 into the spaces between the J-shaped pipes serves for raising the pipes to a high temperature which in turn assists in vapourising the fuel injected into the inlet ends, and in this way very complete combustion can be ensured in a relatively short length of travel of the compressed air.

In any of the arrangements above described the outlet openings 22 may be covered by gauze.

For an internal-combustion turbine unit it would be the usual practice for a plurality of such combustion chambers to be used (for example, five or six), arranged in a circle and angularly spaced from one another, their axes being substantially parallel.

What I claim as my invention and desire to secure by Letters Patent of the United States is:

1. A liquid fuel combustion chamber, for an internal-combustion turbine unit having an air compressor, comprising an outer casing within and along which air is supplied, an inner casing spaced from the outer casing and within which combustion is substantially completed, said inner casing having a baffle at its inlet end for preventing free ingress of air at that end, a circle of J-shaped pipes in said inner casing with their main portions substantially parallel to one another and supported with their inlet ends in holes in said baffle so as to admit air from behind the baffle into the inner casing, and with their other ends forming outlets offset laterally and screened from the incoming air by said baffle, means for delivering liquid fuel to the inlet ends of said pipes, and other means for adding air to the interior of said inner casing as secondary air.

2. A liquid fuel combustion chamber, for an internal-combustion turbine unit having an air compressor, comprising an outer casing within and along which air is supplied, an inner casing spaced from the outer casing and within which combustion is substantially completed, said inner casing having a baffle at its inlet end for preventing free ingress of air at that end, a circle of J-shaped pipes in said inner casing with their main portions substantially parallel to one another and supported with their inlet ends in holes in said baffle so as to admit air from behind the baffle into the inner casing, and with their other ends forming outlets offset laterally and screened from the incoming air by said baffle, said outlet ends being in a circle which is arranged radially outwardly of the circle of the inlet ends of said pipes, means for delivering liquid fuel to the inlet ends of said pipes, and other means for adding air to the interior of said inner casing as secondary air.

3. A liquid fuel combustion chamber, for an internal-combustion turbine unit having an air compressor, comprising an outer casing within and along which air is supplied, an inner casing spaced from the outer casing and within which combustion is substantially completed, said inner casing having a baffle at its inlet end, a plurality of J-shaped pipes in said inner casing with their main portions supported with their inlet ends in a circle of holes in said baffle, and with their other ends forming outlets offset laterally radially outwardly to be screened from the incoming air by said baffle, means for delivering liquid fuel to the inlet ends of said pipes, and a plurality of pipes supported in openings in said baffle and leading to the interior of said inner casing, for supplying secondary air, the openings for said second-mentioned pipes being substantially in a circle at a larger radius than that first-mentioned, said second-mentioned pipes spaced between the outlet ends of said J-shaped pipes.

4. A liquid fuel combustion chamber, according to claim 3, characterised in that each of said second-mentioned pipes is perforated and closed at its end remote from said baffle.

5. A liquid fuel combustion chamber, according to claim 3, characterised in that each of said second-mentioned pipes is open at its end remote from said baffle, to supply diluent air, and has at least one opening between its ends to supply secondary air.

6. A liquid fuel combustion chamber, for an internal-combustion turbine unit having an air compressor, comprising an outer casing within and along which air is supplied, an inner casing spaced from the outer casing and within which combustion is substantially completed, said inner casing having a baffle at its inlet end for preventing ingress of air at that end and said inner casing having its walls pressed in to form externally V-sectioned longitudinal passages, said passages narrowing from the inlet end towards the outer end, holes in the pressed-in walls, a plurality of J-shaped pipes in the interior of said inner casing with their main portions substantially parallel to one another and supported with their inlet ends in holes in said baffle so as to admit air from behind the baffle into the inner casing, and with their other ends forming outlets offset laterally outwardly to be screened from the incoming air by said baffle, and means for delivering liquid fuel to the inlet ends of said pipes.

7. A liquid fuel combustion chamber, for an internal-combustion turbine unit having an air compressor, comprising walls providing a space with an inlet for air and with an outlet, a plurality of pipes, in said space, with their inlet ends directed towards the incoming air, the other ends of the pipes being curled round through angles of more than 90° and being offset laterally from the inlet ends, baffle means interposed at the inlet end of said space to screen said outlet ends of said pipes from the incoming air, said baffle means having holes to receive the inlet ends of said pipes, means for injecting fuel into the inlet ends of said pipes, and means for supplying air to said space as secondary and as diluent air to mix with the products of combustion issuing from said outlet ends of said pipes.

SIDNEY ALLEN.

REFERENCES CITED

The following references are of record in the file of this patent:

UNITED STATES PATENTS

| Number | Name | Date |
|---|---|---|
| 1,386,091 | Chapman | Aug. 2, 1921 |
| 2,332,866 | Müller | Oct. 26, 1943 |
| 2,404,335 | Whittle | July 16, 1946 |
| 2,411,663 | McCollum | Nov. 26, 1946 |
| 2,416,935 | McCollum | Mar. 4, 1947 |